INVENTOR.
NISSIM CALDERON

United States Patent Office 3,422,034
Patented Jan. 14, 1969

3,422,034
POLYALKYLENE OXIDE POLYMERIZATION
PROCESS AND PRODUCT
Nissim Calderon, Akron, Ohio, assignor to The Goodyear Tire & Rubber Company, Akron, Ohio, a corporation of Ohio
Filed Aug. 26, 1964, Ser. No. 392,188
U.S. Cl. 260—2
Int. Cl. C08g 23/14; C08g 23/00; B01j 11/00
12 Claims

ABSTRACT OF THE DISCLOSURE

A catalyst system for vicinal alkylene oxides and vicinal alkylene sulfides polymerization, comprised of dialkylzinc and hydrazine, results in semicrystalline elastomeric polymers. The poly(propylene oxide) obtained by the described catalyst exhibits solubility and swelling characteristics in acetone, which indicate a broad distribution of the crystalline sequences among the polymer chains. The activity of the dialkylzinc-hydrazine catalyst depends on the molar ratio of hydrazine to dialkylzinc. Best results are achieved when the hydrazine/dialkylzinc ratio is in the range 0.6–0.8. By using hydrazine/water combinations as the secondary component with dialkylzinc, it is possible to prepare poly(propylene oxides) with varying acetone solubility and swelling characteristics.

Figure 1:
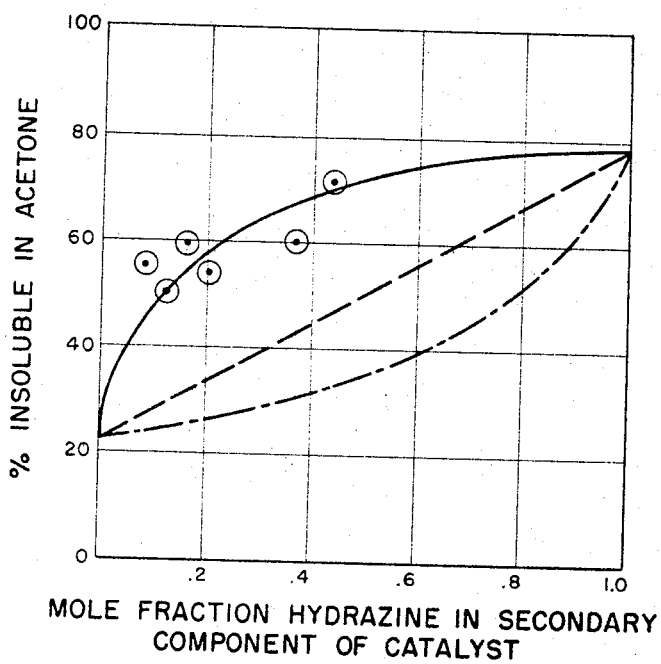

This invention relates to polymerizing epoxides and episulfides. More particularly it relates to a novel catalyst system for polymerizing these monomers, to the process employing the catalyst, and to the resulting novel polymers. Even more particularly, the invention has special application to that class of epoxides and episulfides known as alkylene oxides and alkylene sulfides, and to multi-component catalyst systems which employ as a primary component an organo-metallic compound.

A variety of catalysts are known to be capable of polymerizing alkylene oxides. Such known catalysts are metal halides, metal halide-alkylene oxide complexes, metal alkoxides, and amides of the alkaline earth metals. More recently it has been disclosed that metal alkyl compounds in combination with water or oxygen are suitable catalysts for polymerizing alkylene oxides (see "Polymerization of Alkylene Oxides," Bulletin of Japanese Petroleum Institute, vol. 3, March 1961, Junji Furakawa et al.). In the particular case of propylene oxide polymerization, it has been shown that the metal alkyl-water combination yields a high molecular weight polymer.

High molecular weight polymer chains may possess a molecular structure leading to either a substantially crystalline or substantially amorphous (non-crystalline) state of matter. Conversely a polymer chain may be composed of alternate blocks of crystallizable and non-crystallizable segments. Crystalline alkylene oxide polymers, e.g., poly(propylene oxide), are known to be partially insoluble in acetone at 25° C., whereas, amorphous polymers are known to be soluble in acetone. Consequently, when individual segments of a substantially crystalline and substantially amorphous polymer exist as a physical blend, the crystalline material may be separated from the amorphous portion by dissolving the latter in acetone. However, if the crystalline and amorphous sequences are in the form of stereoblocks, the polymer will display a lower degree of solubility in acetone than crystalline-amorphous polymer admixtures. The stereoblock polymers will also exhibit a high degree of swelling in acetone. Gel network formation theory suggests that the soluble portion will consist of wholly amorphous polymer chains and also those polymer chains having on the average less than one sequence of crystalline units per weight average molecular weight molecule. Therefore, the degree of solubility of a stereoblock polymer depends on the distribution of crystalline sequences amongst the chains as well as the molecular weight distribution of the polymer.

The poly(propylene oxide) produced by the process of the invention utilizing a metal alkyl-hydrazine catalyst system as hereinafter defined, contains approximately 80% acetone insoluble material. This latter polymer displays a high degree of swelling in acetone, which is in marked contrast to the low degree of swelling normally associated with highly crystalline, highly insoluble polymers. It appears, therefore, that this high swelling, acetone insoluble polymer consists of a stereoblock polymer of alternate crystalline and non-crystalline sequences. In addition, the acetone insoluble fractions of the polymers produced in accordance with this invention have low densities. This indicates a low degree of crystallinity which is highly desirable for elastomeric applications. Since the tensile strength and other ultimate strength properties of elastomers are related to the ability of the elastomer to crystallize on stretching, it follows that the stereoblock polymers of this invention will be superior to the blend of tactic and atactic polymers often formed by polymerization. This is so because most of the stereoblock polymer molecules will be able to contribute to the ultimate strength, whereas, only the tactic polymers may contribute greatly, to the ultimate strength in the case of polymers consisting essentially of a blend of tactic and atactic chains. The amount of tactic polymer in these blends of tactic and atactic polymers made with other catalysts must necessarily be relatively small in order for the polymer to remain soft and flexible, hence, one is forced to compromise ultimate strength for flexibility. This compromise is unnecessary with the elastomers made by this invention as the resulting stereoblock polymer, by their very nature, are both very flexible and strong.

Because the term stereoblock is not precisely defined or convenient to measure quantitatively, and also because it is possible to have various types and relative degrees of stereoblock character in a polymer, an operational definition for the novel polymers of this invention which is both unambiguous and also convenient to measure has been selected. This definition is based on three parameters: (a) the inherent viscosity $\{\eta\}$ as a measure for the molecular weight, (b) the solubility of the bulk polymer in a selective solvent which dissolves the amorphous polymer but does not dissolve the crystalline polymer, and (c) the swelling value of the insoluble portion in the said selective solvent.

The novel polymers of this invention are comprised of epoxides and episulfides; are substantially gel-free as indicated by their solubility in a good solvent, i.e. a solvent which will dissolve both amorphous and crystalline forms of the polymer; are partly crystalline polymers which, after aging for at least 48 hours at a temperature of 30° C. to 60° C. below their melting point, have a swelling value of at least 8, as determined in a selective solvent, at a temperature in the range of 30° C. to 60° C. below the melting point of the polymer; and their inherent viscosities $\{\eta\}$ are smaller than $[11-.0025 (90-I)^2]$, where I is the percent insoluble in the selective solvent. The novel polymers of this invention are even more preferred when their inherent viscosities $\{\eta\}$ are smaller than $[9-0.01 (80-I)^2]$, where I has the meaning indicated above.

A good solvent should preferably be a hydrocarbon with a solubility parameter within ±1.7 (cal./cc.)^½ units of the solubility parameter of the polymer. A definition of the solubility parameter, which is the square root of the cohesive energy density, and also a method of calculating it, are given in an article by P. A. Small, Journal of Applied Chemistry, 3, 71 (1953). Small's method leads to a value of 7.88 (cal./cc.)$^{1/2}$ for the solubility parameter of poly(propylene oxide), hence hydrocarbon solvents having solubility parameters between 6.18 and 9.58 (cal./cc.)$^{1/2}$ are preferred. Benzene with a solubility parameter of 9.15 (cal./cc.)$^{1/2}$ is most preferred.

The critical part of the definition of the polymer of this invention is the term selective solvent. The important characteristic of a selective solvent is that it be capable of dissolving the completely amorphous polymer, incapable of dissolving the completely crystalline polymer, and capable of partially dissolving partly crystalline polymers. While these characteristics may be easily ascertained by experimentation obvious to those skilled in these arts, it may be expected that suitable selective solvents will be found in the class of liquids having solubility parameters which differ by 1.7 to 4.0 (cal./cc.)$^{1/2}$ units from that of the polymer. The preferred selective solvents are ketones whose solubility parameters are greater than those of the polymer by 1.7 to 3.0 (cal./cc.)$^{1/2}$ units. For poly(propylene oxide) the preferred ketones will have solubility parameters of between 9.58 and 10.88 (cal./cc.)$^{1/2}$. Acetone with a solubility parameter of 10.0 (cal./cc.)$^{1/2}$ is most preferred as a selective solvent. The details of the techniques to measure the amount of polymer insoluble in the selective solvent and the swelling value of the insoluble fraction in the selective solvent are given infra.

For poly(propylene oxide), which has a melting point of about 70° C., the preferred temperatures defined above will be between 10 and 40° C., with the most preferred temperature being 25° C., i.e. in the vicinity of room temperature.

The above definition will distinguish the novel polymers of this invention, which are characterized by high insolubility and high swelling in the selective solvent, in the practical range of inherent viscosities, i.e. up to values of 11, from all polyepoxide and polyepisulfide polymers prepared heretofore. The highly crystalline poly(propylene oxide) prepared with a ferric chloride/propylene oxide complex catalyst has too low a swelling value in acetone (Table II). The highly amorphous poly(propylene oxide) prepared with a calcium amide system as catalyst is completely soluble in acetone. Polymers and copolymers of a relatively random distribution of tactic and atactic structural units are either less than 24.6% insoluble in the selective solvent or have a swelling value of 8.0 or less in the selective solvent. A poly(propylene oxide) with stereo block structure characterized by many short tactic sequences has a swelling value of 8.0 or less in acetone. Mixtures of tactic and atactic poly(propylene oxide) have too high a solubility and too low a swelling value in acetone.

The practical importance of this distribution of crystalline content in a polymer is the retention of good elastomeric qualities which have been found to be superior to any rubbery poly(propylene oxide) known.

In its broad scope the subject invention is useful for polymerizing monomers broadly characterized as epoxide and episulfides, and particularly those materials known as oxirane

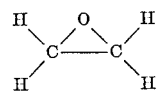

and thiirane

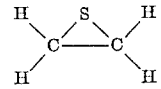

and the substituted derivatives thereof, to form high molecular weight polymers. Representative examples of substituent radicals of oxirane and thiirane which may be usefully employed in the practice of this invention are alkyl, cycloalkyl, aryl, aralkyl, alkenyl, alkoxy and alkenoxy. Alkyl radicals containing up to ten carbon atoms are especially preferred.

Representative examples of derivatives of the oxirane epoxides are: ethylene oxide, propylene oxide, 1-butene oxide, 1-hexene oxide, 1-octene oxide, 1-dodecene oxide, 1-allyl ethylene oxide, allyl glycidyl ether, cyclohexyl ethylene oxide, styrene oxide, benzyl ethylene oxide, phenyl glycidyl ether, epichlorohydrin, epibromohydrin, epifluorohydrin, 1-trifluoromethyl ethylene oxide, glycidyl methacrylate, isobutylene oxide, 2-butene oxide (cis or trans), 2-octene oxide, cyclohexene oxide, vinyl cyclohexene monoxide or dioxide, 1,1,2-trimethyl ethylene oxide, 1,1,2,2-tetramethyl ethylene oxide, cyclopentene oxide, 2,4,4-trimethyl-1,2-epoxypentane, 2,4,4-trimethyl-2,3-epoxypentane, 1-phenyl-1,2-epoxypropane, toluyl glycidyl ether, chlorophenyl glycidyl ether, naphthyl glycidyl ether, dicyclopentadiene monoxide or dioxide, isoprene monoxide, limonene monoxide, cyclooctadiene monoxide, butadiene monoxide or dioxide, 4,5-epoxy-hexene-1, 1,4-hexadiene monoxide.

Representative examples of substituted thiirane monomers suitable for use in practicing this invention are: ethylene sulfide, propylene sulfide, 1-butene sulfide, 2-butene sulfide, styrene sulfide, isobutylene sulfide, 1,1,2-trimethyl ethylene sulfide, 1,1,2,2-tetramethyl ethylene sulfide, 1-chloromethyl ethylene sulfide.

The catalyst employed in the practice of this invention is a mixture of at least two components. The primary component is an organo-metallic constituent with the general formula MR''$_2$ wherein M represents a divalent metal. It is preferred to employ zinc, magnesium or cadmium and of these zinc is most preferred. Each R'' represents at least one member selected from the group of radicals consisting of alkyl, cycloalkyl, alkenyl, aryl, aralkyl, alkoxy and hydrogen, and may be the same or dissimilar. The preferred R'' substituents are alkyl or aryl radicals, especially alkyl radicals containing up to ten carbon atoms.

Representative examples of the primary catalyst component which may be usefully employed in the practice of this invention are dimethyl zinc, diethyl zinc, dibutyl zinc, diisobutyl zinc, diphenyl zinc, dibenzyl zinc, diallyl zinc, methyl ethyl zinc, diethyl magnesium, diphenyl magnesium and diethyl cadmium. Diethyl zinc is a convenient and most preferred primary component.

The secondary catalyst component employed in this invention is hydrazine or its mono- or symmetrically disubstituted derivatives. These may be represented by the general formula:

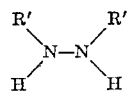

wherein each R' represents at least one member selected from the group consisting of alkyl, aryl, aralkyl, alkoxyalkyl, alkoxy, and hydrogen.

Representative examples of the secondary component which may be usefully employed in practicing this invention are hydrazine, methyl hydrazine, ethyl hydrazine, N,N'-dimethyl hydrazine, phenyl hydrazine, N,N'-diphenyl hydrazine, benzyl hydrazine, and N-phenyl-N'-ethyl hydrazine. Hydrazine is a preferred secondary component.

In practicing this invention the best results for achieving the desirable stereoblock polymer, consisting of crystalline and non-crystalline sequences, will be obtained if the secondary component is employed under conditions which are as anhydrous as practicable. However, there may be occasions where, for a particular application of the resulting elastomer, one may wish to make the polymer more or less crystalline or amorphous. It has been found that, by including a controlled amount of water with the hydrazine, it is possible to regulate the degree of stereoregularity introduced into the polymer chain as indicated by the acetone solubility and swelling value of the resulting polymer. In practicing the invention, one may control the resultant stereoregularity of the polymer to any desired point between that achieved by using the known metal alkyl and water (or oxygen, or alcohol) catalyst, and the novel metal alkyl and hydrazine catalyst of this invention.

While the amount of catalyst used in the practice of this invention is not critical, it is to be understood that a sufficient amount should be used to provide a catalytic effect. It has been found that excellent results are obtained by employing from $10^{-4}$ to one mol of metal alkyl in the catalyst per liter of monomer and that particularly good results are achieved by using from $10^{-3}$ to $10^{-1}$ mols of metal alkyl in the catalyst per liter of monomer.

The ratio of the secondary to the primary catalyst component may vary over a wide range and still enable the catalyst to function. However, it has been found that there is a limited range wherein substantial conversions result. This range may vary somewhat as the primary and secondary components vary in their particular formulation. For any specific pair of components, however, the optimum molar ratio of secondary to primary components may be readily ascertained by techniques well known to those skilled in the art and exemplified infra. The satisfactory molar ratios of secondary to primary component is usually found in the range 0.1 to 10. The optimum molar ratio is often found in the range 0.2 to 5. A preferred range for this molar ratio is 0.4 to 1.2. In the instant case where the preferred catalyst components, hydrazine and diethyl zinc, are employed with poly(propylene oxide) maximum conversions have been found to occur in the range wherein the molar ratio of hydrazine to diethyl zinc is 0.6 to 0.8.

In practicing this invention the reaction temperature may be varied over a wide range; for instance, from about $-50°$ to about $200°$ C. It has been found that a temperature of from about $25°$ to about $80°$ C. is convenient for carrying out these polymerizations. As is well understood with reactions of this type, the reaction time generally increases with decreasing temperature, although other commonly understood factors also influence the polymerization rate.

While the process may be conducted at supra-atmospheric, as well as sub-atmospheric pressures, such as are frequently utilized for polymerization reactions, it is an advantage of the subject invention that the process may be performed with good results either very near to or at at atmospheric pressure.

The polymerization should be conducted in an inert ambient. Suitable for this purpose would be an atmosphere of any known inert gas, such as nitrogen, argon, helium; or a vacuum. The polymerization process of this invention may be carried out in bulk or in an inert solvent or suspending medium. Any common aromatic, cycloaliphatic or aliphatic hydrocarbon or ether may be used for a solvent; as for example, benzene, cyclohexane, heptane, hexane, diethyl ether, tetrahydrofuran and the like. Benzene has been found to be generally suitable for this purpose. The inert diluent may be present in the amount of between 0 and 50 volumes per volume of episulfides and epoxides used.

In addition to the polymers formed by homopolymerizing monomers of the general type disclosed, the catalyst system of the subject invention may be used to form saturated copolymers thereof as well as unsaturated, vulcanizable copolymers. Representative examples of the saturated copolymers are: copolymers of ethylene oxide and propylene oxide; or copolymers of ethylene sulfide and propylene sulfide. A conventionally vulcanizable copolymer would result, for example, from polymerizing allyl glycidyl ether and propylene oxide monomers; or vinyl cyclohexene monoxide and 1-butene oxide monomers; or cyclooctadiene monoxide and propylene oxide monomers; or bycyclopentadiene monoxide and propylene oxide monomers. An example of a halo-substituted copolymer is that formed by copolymerization of epichlorohydrin and propylene oxide. More complicated interpolymers are also envisioned as falling under the scope of this invention. For instance, to control crystallinity, to improve vulcanizability or otherwise modify and improve the polymers made by this process, it may be beneficial to use one or more saturated epoxide monomers in conjunction with one or more unsaturated epoxide monomers; e.g., the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene monoxide monomers.

The rubbery polyepoxides and polyepisulfides produced in the practice of the subject invention are high molecular weight polymers (with inherent viscosities exceeding about 0.4 dl./g.), possessing good elastomeric properties when vulcanized. These elastomers may be compounded and processed by normal procedures known in the art. They are readily compounded with fillers such as carbon black and with antioxidants and other conventional compounding materials. The unsaturated elastomers are readily vulcanized with the aid of conventional sulfur vulcanizing systems appropriate for the degree and type of unsaturation in the elastomer.

EXAMPLES

The practice of this invention is illustrated by reference to the following examples which are intended to be representative rather than restrictive of the scope of this invention. All polymerization operations were conducted under a nitrogen atmosphere.

As employed in the data presented infra: "inherent viscosity" $\{\eta\}$ is defined as the natural logarithm of the relative viscosity at $30°$ C. divided by polymer concentration (in g./dl.) for a 0.05 to 0.10% solution of polymer in benzene containing 0.1% phenyl-beta-naphthylamine, and is expressed in units of deciliters per gram (dl./g). The "swelling value" of the acetone insoluble material is defined as the ratio of the weight of the swollen sample, after immersion in acetone for 48 hours at $25°$ C., to its weight after drying to constant weight. The swelling value is normally determined on the acetone insoluble fraction of the polymer which has been prepared by extracting out the soluble fraction with acetone, drying the insoluble residue, molding it at $85°$ C. into a ¼" thick sheet and storing in the dark at room temperature for 48 hours prior to immersion in acetone to determine the swelling value. While this rigidly controlled thermal history is to be preferred, it is frequently observed that the same value is obtained for the swelling value determined on the original polymer sample without the prior extraction and molding treatment. Any variation from the preferred procedure for determining swelling value will be pointed out in the examples infra.

*Example 1*

A mixture consisting of 2 volumes benzene and 1 volume propylene oxide was passed through a silica gel column under nitrogen gas. Ninety ml. of this mixture was then charged into a four-ounce glass bottle. 0.135 ml. of anhydrous hydrazine ($4.40 \times 10^{-3}$ mols) was then added to the bottle utilizing common syringe techniques. The bottle was capped and shaken 15 seconds. Four ml. of a 1.55 molar solution of diethyl zinc in heptane was injected into the bottle which was then screw capped. A control bottle from which hydrazine was excluded was prepared similarly. The polymerization bottles were tumbled in a $50°$ C. water bath for 24 hours. The polymerizations were terminated by adding 10 ml. of methanol containing 0.2 gram of phenyl-beta-naphthylamine into each of the polymerization bottles. The contents of the bottle were then boiled in water for 2 hours to destroy the excess catalyst and precipitate the polymer. The product was subsequently dried in a vacuum desiccator.

A series of polymerization runs were conducted by varying the amount of anhydrous hydrazine in the above recipe, thus changing the molar ratio of hydrazine to diethyl zinc in the catalyst.

Table I presents the results of these experimental runs.

TABLE I

| Run No. | $N_2H_4/(C_2H_5)_2Zn$, Molar Ratio | Percent Conversion to Polymer | $[\eta]$ (dl./g.) |
|---|---|---|---|
| 1 | 0 | 12.8 | 5.7 |
| 2 | .25 | 7.8 | 9.1 |
| 3 | .33 | 3.8 | (²) |
| 4 | .42 | 5.5 | 19.7 |
| 5 | .68 | 90.0 | 25.2 |
| 6 | .75 | 67.5 | 7.3 |
| 7 | .81 | 17.5 | 15.7 |
| 8 | 1.00 | (¹) | (²) |
| 9 | 1.41 | (¹) | (²) |

¹ Trace amounts.
² Insufficient polymer to determine $[\eta]$.

*Example 2*

A sample of poly(propylene oxide) was prepared according to the procedure of Example 1. A second sample of poly(propylene oxide) was prepared by a similar procedure except that water was substituted for hydrazine as cocatalyst. The molar ratio of diethyl zinc to water was 1:1. In addition, a sample of highly tactic poly(propylene oxide) prepared with a catalyst comprising an iron salt was added to the series. These samples were extracted with acetone for 72 hours at room temperature. The percentage of acetone insoluble polymer for each sample was determined and is given by 100 $Wa/Wo$, where $Wo$ is the weight of polymer before extraction and $Wa$ is the weight of polymer recovered after the acetone extraction and drying in a vacuum oven for 24 hours at room temperature and 5 torr.

The acetone insoluble portions were molded at 85° C. into ¼″ sheets and stored in the dark at room temperature for 48 hours. The swelling value in acetone was determined for these three acetone insoluble samples having the same thermal history. In addition, the densities of these acetone insoluble samples were determined using a density gradient column. The data are disclosed in Table II.

TABLE II

| Sample No. | Catalyst System | Percent Acetone Insoluble | Swelling Value of Acetone Insoluble Fraction | Density of Acetone Insoluble Fraction |
|---|---|---|---|---|
| 1 | Diethyl zinc/Hydrazine | 79 | 19.98 | 1.0275 |
| 2 | Diethyl zinc/Water | 22 | 4.67 | 1.0400 |
| 3 | Ferric Chloride/Propylene Oxide Complex | 98 | 1.33 | >1.0500 |

*Example 3*

A series of polymerizations similar to that conducted in Example 1 were carried out using hydrazobenzene instead of hydrazine. Various molar ratios of hydrazobenzene were applied to diethyl zinc. The remaining variables were maintained as noted in Example 1 with the exception of polymerization time. After 90 hours the solid polymers were isolated as in Example 1 and the inherent viscosity, the acetone insolubility and the swelling value of the acetone insoluble fractions were determined. These are presented in Table III.

TABLE III

| Sample No. | $(C_6H_5NH)_2/R''_2Zn$, Molar ratio | Percent conversion | $[\eta]$ (dl./g.) | Percent Acetone insoluble | Swelling value |
|---|---|---|---|---|---|
| 1 | 1.50 | 21.3 | 1.48 | 53.8 | 18.6 |
| 2 | 1.25 | 30.5 | 3.99 | 71.0 | 17.7 |
| 3 | 1.00 | 57.6 | 6.75 | 72.4 | 17.0 |
| 4 | 0.75 | 61.8 | 8.75 | 80.0 | 18.6 |
| 5 | 0.50 | 37.4 | 8.02 | 81.2 | 21.2 |
| 6 | 0.25 | 19.3 | 6.97 | 88.5 | 20.6 |

*Example 4*

A polymerization run similar to that conducted in Example 1 was carried out using 10 ml. of methyl thiirane (propylene sulfide) monomer in 80 ml. of benzene. 0.112 ml. of anhydrous hydrazine and 2.4 ml. of diethyl zinc (1.94 molar in benzene) were added. The molar ratio of hydrazine to diethyl zinc was 0.68:1. Polymerization was allowed to proceed in a 30° C. water bath. The polymerization bottle was shaken periodically. After 16.7 hours, the polymerization mass was precipitated in excess methanol containing phenyl-beta-naphthylamine antioxidant. The amount of dried poly(propylene sulfide) was 3.9 g. (42% yield). The inherent viscosity was 0.42 dl./g.

*Example 5*

A five gallon polymerization reactor equipped with a mechanical stirrer was dried and flushed thoroughly with nitrogen for 45 minutes. A mixture containing 13 liters of benzene, 4 liters of propylene oxide and 2 liters of allyl glycidyl ether was introduced to the reactor followed by the addition of 38 gms. (0.31 mol) of diethyl zinc in heptane solution. After stirring the mixture about 5 minutes, 6.3 gms. (0.20 mol) of anhydrous hydrazine was injected into the mixture. The reactor temperature was raised to 80° C. and maintained at this temperature during the copolymerization process. The copolymerization was terminated after 18 hours by injecting 5 gms. of phenyl-beta-naphthylamine dissolved in 40 ml. of methanol. The copolymer cement was removed from the reactor, coagulated in boiling water and dried in a vacuum oven. A 63.5% yield was obtained, based on the weight of the monomers charged.

*Example 6*

The copolymer of propylene oxide (PO) and allyl glycidyl ether (AGE) prepared in Example 5 was compounded according to the recipe in Table IV.

Table IV

|  | Parts |
|---|---|
| PO/AGE Copolymer | 100 |
| HAF—Carbon Black | 50 |
| Zinc oxide | 5 |
| Stearic acid | 3 |
| Sulfur | 2 |
| Tetramethyl thiuram disulfide | 1 |
| Tellurium diethyl dithiocarbamate | 0.5 |

This compound was divided into four portions which were cured at 153° C. for 15, 30, 45 and 60 minutes. Table V discloses the physical test data obtained from an analysis of these respective cure samples. Stress, strain properties were determined at 25° C. on an Instron Testing Machine. The dumbells had a narrowed cross section of 0.1 x 0.625 inch over a length of 0.9 inch. The crosshead speed was two inches per minute.

TABLE V

| Sample No. | Cure Time and Temp. | Tensile Strength (p.s.i.) | Percent Elongation at Break | 300% Modulus (p.s.i.) |
|---|---|---|---|---|
| 1 | 15′/153° C | 2,461 | 705 | 1,062 |
| 2 | 30′/153° C | 2,715 | 625 | 1,353 |
| 3 | 45′/153° C | 3,002 | 610 | 1,484 |
| 4 | 60′/153° C | 2,875 | 585 | 1,513 |

From the data in Table V the 45′/153° C. was selected as the best cure time for a compound mixed according to the recipe in Table IV. Table VI contains additional physical properties of the vulcanizate of poly(propylene oxide/allyl glycidyl ether) copolymer as obtained by a 45′/153° C. curing rate.

TABLE VI

| Physical Test | Value | A.S.T.M. Test Procedure |
|---|---|---|
| Rebound Resilience (percent) at— | | |
| 23° C | 58.5 | D1054-55. |
| 100° C | 66.7 | D1054-55. |
| Shore "A" Hardness | 74 | D676-55T. |
| Crescent Tear Strength (lbs./in.) at— | | |
| 25° C | 525 | D624-54, Die C. |
| 100° C | 285 | D624-54, Die C. |

While all these physical properties are excellent, the crescent tear strength values are outstanding, particularly at the higher temperatures. A similar copolymer made with a diethyl zinc/water catalyst system, and vulcanized similarly, had a crescent tear strength of only 218 pounds per inch of 100° C. This difference is representative of the marked superiority of the stereoblock polymers and copolymers of this invention over the polymers and copolymers made heretofore and is also indicative of the superiority of the novel catalyst system used here over those used previously.

*Example 7*

Two copolymer samples containing 95/5 and 90/10 combined ratios of propylene oxide (PO) and allyl glycidyl ether (AGE), prepared by the catalyst system described in Example 1 (except keeping the molar ratio of $N_2H_4/(C_2H_5)_2Zn$ at .70) were used in an experiment similar to that described in Example 2. In addition, copolymer samples containing varying ratios of propylene oxide/allyl glycidyl ether prepared by different catalytic systems were also used in an experiment similar to that described in Example 2. The relevant data are included in Table VII.

TABLE VII

| Sample | Catalyst System | Combined Weight Ratio of PO/AGE | {η} (dl./g.) | Percent Acetone Insoluble | Swelling Value |
|---|---|---|---|---|---|
| 1 | $(C_2H_5)_2Zn/N_2H_4$ | 95/5 | 8.80 | 36.4 | 15.8 |
| 2 | $(C_2H_5)_2Zn/N_2H_4$ | 90/10 | 9.20 | 16.7 | 11.8 |
| 3 | $(C_2H_5)_2Zn/H_2O$ | 95/5 | 4.79 | 10.5 | 41.10 |
| 4 | $(C_2H_5)_2Zn/H_2O$ | 90/10 | 5.73 | 6.1 | 52.50 |
| 5 | $FeCl_3/PO$ | 97/3 | 2.14 | 23.8 | 7.37 |
| 6 | $FeCl_3/PO$ | 97/6 | 1.87 | 17.8 | 12.55 |
| 7 | $Ca(NH_2)_2$ System | 97/3 | 3.82 | 0.0 | |

*Example 8*

A series of runs was conducted wherein, to a constant amount of diethyl zinc, a varying mixture of $H_2O$ and $N_2H_4$ was added. Eight 4-oz. bottles, dried in an oven at 120° C. for 48 hours and flushed with nitrogen, were charged with 90 ml. of a benzene-propylene oxide (2:1 by volume) mixture which had been passed through a silica gel column. Into each of these bottles four ml. of diethyl zinc solution in heptane (1.55 molar) was injected after the $H_2O+N_2H_4$ mixtures had been added. The bottles were placed in a 50° C. water bath for 24 hours. Termination was accomplished by adding 10 ml. methanol, followed by boiling the contents of the bottle in water for 2 hours followed by drying in a vacuum desiccator. Table VIII includes the polymerization recipe data related to this series of runs. The amounts of diethyl zinc, water and hydrazine used are given in millimols.

TABLE VIII

| Run No. | $[(C_2H_5)_2Zn]$ | $[H_2O]$ | $[N_2H_4]$ | Mol. Frac. of $N_2H_4$* | $\frac{[H_2O]+[N_2H_4]}{[(C_2H_5)_2Zn]}$ Molar Ratio |
|---|---|---|---|---|---|
| 1 | 6.20 | 5.55 | | 0.000 | 0.90 |
| 2 | 6.20 | 5.00 | 0.44 | 0.081 | 0.87 |
| 3 | 6.20 | 4.72 | 0.66 | 0.123 | 0.87 |
| 4 | 6.20 | 4.45 | 0.84 | 0.158 | 0.86 |
| 5 | 6.20 | 4.17 | 1.06 | 0.202 | 0.84 |
| 6 | 6.20 | 3.33 | 1.69 | 0.365 | 0.81 |
| 7 | 6.20 | 2.78 | 2.12 | 0.432 | 0.79 |
| 8 | 6.20 | | 4.22 | 1.000 | 0.68 |

*Mol fraction of $N_2H_4 = \frac{[N_2H_4]}{[N_2H_4]+[H_2O]}$.

It was observed that the increase in conversion of the polymerizing systems was faster in the case of those recipes containing increasing amounts of water as the secondary component of the catalyst. The diethyl zinc/water catalyst gives faster polymerization than the diethyl zinc/hydrazine catalyst system. The results on these experiments are tabulated in Table IX. The procedure followed for the determination of percent insoluble in acetone was identical for all the polymer samples. An accurately weighed sample (1 gram) was placed in a bottle containing 200 ml. of acetone and kept in the dark for 65 hours at room temperature. After centrifuging for 15 minutes, 10 ml. aliquots were taken from the clear solution and placed in pre-weighed aluminum cups. These were evaporated to constant weight to allow determination of the amount of polymer soluble in acetone and thus allowing the calculation of the percent insoluble in acetone by difference. The swelling value of the acetone insoluble fraction was determined by the preferred procedure with the trivial exception that 72 hours immersion in acetone was used rather than 48 hours.

TABLE IX

| Run No. | Mol Fraction of $N_2H_4$ | {η} | Percent Acetone Insoluble | Swelling Value |
|---|---|---|---|---|
| 1 | 0.000 | 4.82 | 22.6 | 6.85 |
| 2 | 0.081 | 6.36 | 55.5 | 8.35 |
| 3 | 0.123 | 7.20 | 50.1 | 8.40 |
| 4 | 0.158 | 8.38 | 59.5 | 14.00 |
| 5 | 0.202 | 5.10 | 53.9 | 7.79 |
| 6 | 0.365 | 6.40 | 60.1 | 12.29 |
| 7 | 0.432 | 9.80 | 71.2 | 15.03 |
| 8 | 1.000 | 14.20 | 78.4 | 20.55 |

Note that as little as 0.1 mol fraction of hydrazine in the secondary catalyst component has markedly increased the amount of acetone insoluble material formed and also increased its swelling value with little change in the inherent viscosity. All polymers in Table IX prepared with catalysts comprised at least in part of hydrazine are more than 50.1% insoluble in acetone and the swelling value is greater than 7.79.

Figure 2:
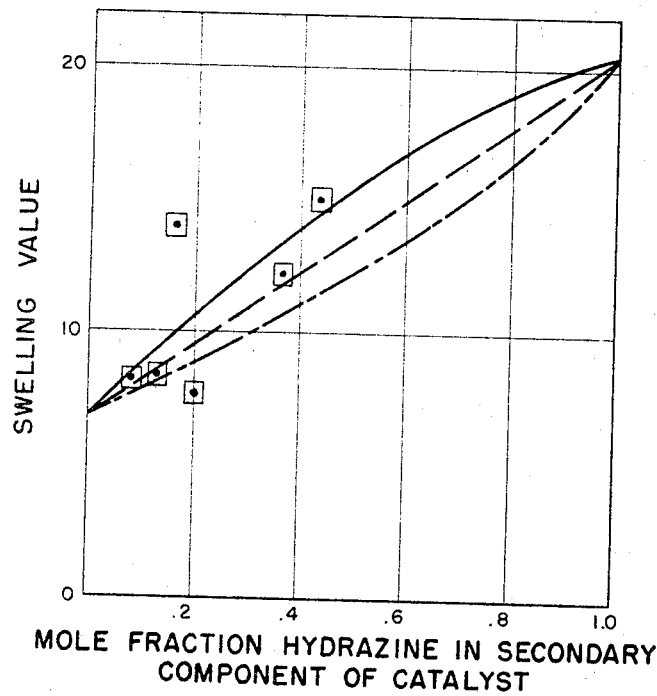

FIGURES 1 and 2 are plots of the data listed in Table VIII and show the marked non-linear dependence of both the percent insoluble in acetone and swelling value on the mol fraction of hydrazine in the secondary component of the catalyst. The marked non-linear dependence of these properties on the mol fraction of hydrazine in the secondary component of the catalyst proves that the diethyl zinc/water-hydrazine catalyst is a different catalyst from that obtained by the use of either diethyl zinc/water or diethyl zinc/hydrazine catalyst systems alone or in physical admixture. If the diethyl zinc/water-hydrazine catalyst system were to act as a simple physical blend of diethyl zinc/water and diethyl zinc/hydrazine catalysts of equal reactivity then the linear behavior indicated by the dashed lines in FIGURES 1 and 2 would be expected. However, the diethyl zinc/hydrazine catalyst is not as reactive as the diethyl zinc/water catalyst and hence one should expect a behavior of the qualitative appearance shown by the dash-dotted lines in FIGURES 1 and 2; i.e., a curve convex to the abscissa, if the novel catalyst of this invention were to act as a simple admixture of diethyl zinc/hydrazine and diethyl zinc/water catalysts. The solid lines of FIGURES 1 and 2 represent the averaged observed dependence of the percent insoluble in acetone or swelling value on the mol fraction of hydrazine in the secondary component of the catalyst. Since this behavior; i.e., a curve concave to the abscissa, is opposed to that expected for simple admixtures of diethyl zinc/water and diethyl zinc/hydrazine catalysts, we must conclude that the diethyl zinc/water-hydrazine catalyst is a totally novel catalyst.

*Example 9*

Figure 3:
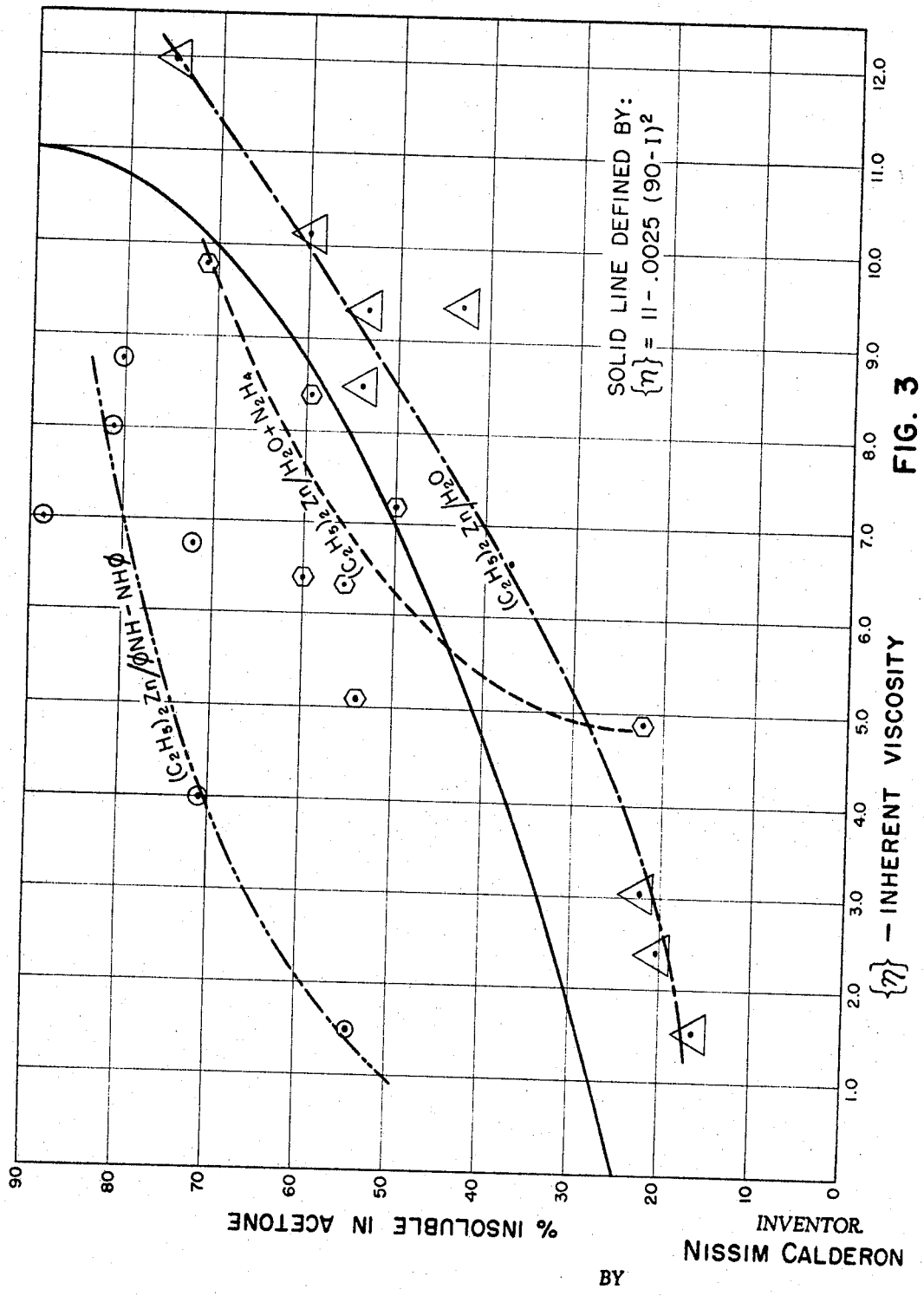

FIGURE 3 illustrates a plot of the percent insoluble in acetone vs. the inherent viscosity for poly(propylene oxide) polymers which were prepared by diethyl zinc/water, diethyl zinc/hydrazine-water and diethyl zinc/diphenyl hydrazine catalytic systems. All these polymers are substantially amorphous having swelling values above 8. However, the polymers made with catalysts comprising diethyl zinc/hydrazine, diethyl zinc/diphenyl hydrazine and diethyl zinc/hydrazine and water have a higher percent insoluble figure than the diethyl zinc/$H_2O$ system for any given inherent viscosity in the practical range of 0.0–11.0 dl./g. This suggests that although the polymers prepared by diethyl zinc/hydrazine (or its derivatives) and diethyl zinc/water have roughly the same amount of crystalline material, the distribution of the crystalline sequences between the chains in the polymers prepared by the diethyl zinc/hydrazine (or its derivatives) is more uniform, yielding an elastomer with good physical properties. It was found that the following relationships characterize the poly(propylene oxides) prepared by diethyl zinc/hydrazine, diethyl zinc/hydrazine-water and diethyl zinc/diphenyl hydrazine catalysts and differentiate them from poly(propylene oxides) made with all other known catalyst systems:

$$\text{inherent viscosity} - <11 - .0025 (90-I)^2$$
$$\text{swelling value} - >8$$

where I represents percent insoluble in acetone.

While certain representative embodiments and details have been shown for the purpose of illustrating the invention, it will be apparent to those skilled in this art that various changes and modifications may be made therein without departing from the spirit or scope of the invention.

What is claimed is:

1. The method for polymerizing vicinal alkylene oxides and vicinal alkylene sulfides which comprises:
   (I) contacting a monomeric material which comprises at least one member of the group consisting of vicinal alkylene oxides and vicinal alkylene sulfides with the formula

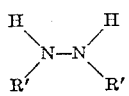

(a) wherein Q is a member of the group consisting of oxygen and sulfur;
   (b) wherein each R is at least one member of the group consisting of alkyl, cycloalkyl, aryl, aralkyl, alkenyl, alkoxy, alkenoxy, hydrogen and mixtures thereof, containing up to 10 carbon atoms in each R;
   (II) a catalytic amount of a catalyst comprising a mixture of:
   (a) at least one component with the formula MR''$_2$
      (1) wherein each R'' is selected from the group consisting of alkyl, cycloalkyl, alkenyl, aryl, aralkyl, alkoxy, hydrogen and mixture thereof, containing up to 10 carbon atoms in each R'';
      (2) wherein M is a divalent metal selected from the group consisting of zinc, magnesium, cadmium and mixture thereof; and
   (b) at least one component with the formula

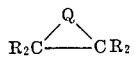

wherein each R' is selected from the group consisting of alkyl, aryl, aralkyl, alkoxyalkyl, alkoxy, hydrogen and mixtures thereof, containing up to 10 carbon atoms in each R';
   (c) at least one component which is water;
   (d) wherein the molar ratio of HR'N—NH'H to MR''$_2$ is between 0.1 and 10.0; and
   (e) wherein the molar ratio of $H_2O$ to HR'N—NR'H is between zero and 9;
   (III) in an inert atmosphere at a temperature between −50° C. and 200° C.

2. The process of claim 1 wherein the monomeric material is represented by the formula

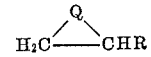

wherein R represents at least one member of the group consisting of an alkyl radical containing up to 10 carbon atoms and hydrogen.

3. The process according to claim 1
   (A) wherein the monomer is represented by the formula

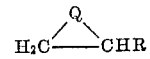

(B) wherein R is at least one member of the group consisting of alkyl radicals containing up to 10 carbon atoms and hydrogen;
   (C) wherein each R'' comprises at least one member of the group consisting of aryl radicals and alkyl radicals containing up to 10 carbon atoms; and
   (D) wherein each R' comprises at least one member of the group consisting of aryl radicals, alkyl radicals and containing up to 10 carbon atoms and hydrogen; and
   (E) wherein the ratio of R'HN—HNR' to MR''$_2$ is between 0.4 and 1.2.

4. The process according to claim 3 wherein each R'' represents an alkyl radical containing up to 10 carbon atoms; and each R' comprises at least one member of the group consisting of an aryl radical and hydrogen.

5. The process according to claim 4 wherein R' represents a phenyl radical.

6. The process according to claim 4 wherein M represents zinc and R' represents hydrogen.

7. The process according to claim 1 wherein a monomeric material comprises from 80 to 100% propylene oxide and from 20 to 0% allyl glycidyl ether; wherein MR''$_2$ represents diethyl zinc; wherein R'HN—NHR' represents hydrazine; and wherein the molar ratio of hydrazine to diethyl zinc is between 0.6 and 0.8.

8. The process according to claim 7 wherein the molar ratio of water to hydrazine is zero.

9. A composition of matter comprising the polymerization product of at least one member selected from the group consisting of vicinal alkylene oxides and vicinal alkylene sulfides, characterized by:
   (A) being gel-free as indicated by its complete solubility in a good solvent as hereinbefore defined;
   (B) being partly crystalline as indicated by at least 24.6% insolubility in a selective solvent capable of dissolving the completely amorphous polymer but incapable of dissolving the highly crystalline polymer at a temperature of 30–60° C. below the melting point of the polymer and after aging the polymer for at least 48 hours in this temperature range;
   (C) possessing an inherent viscosity $\{\eta\}$ (dl./g.) in a hydrocarbon solvent with a solubility parameter within $\mp 1.7$ (cal./cc.)$^{1/2}$ units of the solubility parameter of said polymerization product, and said inherent viscosity is less than $[11-.0025 (90-I)^2]$, where I is the percent insoluble in the selective solvent; and (D) having a fraction insoluble in the selective solvent which has a "swelling value," as hereinbefore defined, in the selective solvent of at least 8.

10. A composition of matter according to claim 9 wherein the solvent of (C) is benzene and the selective solvent is acetone.

11. A composition of matter according to claim 9 wherein the polymer comprises the polymerization product of at least one member selected from the group consisting of alkylene oxides and alkylene sulfides with up to 12 carbon atoms per monomer molecule.

12. A composition of matter according to claim 11 wherein the polymer is comprised of the polymerization product of a mixture of propylene oxide and allyl glycidyl ether.

References Cited

FOREIGN PATENTS 957,391  5/1964  Great Britain.

OTHER REFERENCES

J. of Polymer Science, vol. 47, issue 149 (1960), pp. 486–488 relied on.

WILLIAM H. SHORT, *Primary Examiner.*

T. PERTILLA, *Assistant Examiner.*

U.S. Cl. X.R.

252—431; 260—79.7, 88.3